May 22, 1951 D. H. RANSOM 2,553,605

BUSY INDICATION IN ELECTRONIC SWITCHING EQUIPMENT FOR AUTOMATIC TELEPHONE EXCHANGES

Filed June 19, 1947 3 Sheets-Sheet 1

Inventor
David Hiram Ransom

By

Attorney

May 22, 1951 D. H. RANSOM 2,553,605

BUSY INDICATION IN ELECTRONIC SWITCHING EQUIPMENT FOR AUTOMATIC TELEPHONE EXCHANGES

Filed June 19, 1947 3 Sheets-Sheet 2

Inventor
David Hiram Ransom
By
R. P. Morris
Attorney

May 22, 1951 D. H. RANSOM 2,553,605

BUSY INDICATION IN ELECTRONIC SWITCHING EQUIPMENT FOR AUTOMATIC TELEPHONE EXCHANGES

Filed June 19, 1947 3 Sheets-Sheet 3

Inventor
David Hiram Ransom
By
R P Morris
Attorney

Patented May 22, 1951 2,553,605

UNITED STATES PATENT OFFICE 2,553,605

BUSY INDICATION IN ELECTRONIC SWITCHING EQUIPMENT FOR AUTOMATIC TELEPHONE EXCHANGES

David Hiram Ransom, London, England, assignor to International Standard Electric Corporation, New York, N. Y., a corporation of Delaware Application June 19, 1947, Serial No. 755,560
In Great Britain June 20, 1946

26 Claims. (Cl. 179—18)

This invention relates to telecommunication switching systems of the type in which the functions more usually carried out by electro-mechanical switches and relays are carried out by electronic devices or other non-mechanical means.

In one of its broader aspects, the invention consists of a telecommunication switching system in which a number of communication paths is provided in the form of different time positions in a repetitive cycle of pulses of electrical energy and in which a reversal of the polarity of a pulse occurring at a given time position, gives an indication that a communication path is in use.

In another of its broader aspects, the invention consists of a telecommunication switching system in which a number of communication paths is provided in the form of different time positions in a repetitive cycle of pulses of electrical energy and in which a reversal of the polarity of a pulse occurring at a given time position secures a connection against intrusion.

The invention will be more readily understood from the description which follows, of an embodiment of the invention, developed for use in an automatic telephone system.

In such a system, a number of subscriber's telephone instruments may be terminated in an exchange upon the electrodes of a cathode ray tube in which the function of a distributor is performed by the cathode ray continuously scanning such electrodes in regular succession, each of such subscriber's lines being allotted to a certain electrode and consequently to a definite time position in the scanning cycle. Other electronic devices can be used as a distributor but a cathode ray tube is chosen for illustration in the explanation which follows.

When a subscriber initiates a call, a potential indicative of a calling condition is applied to an electrode of the distributor assigned to that subscriber's line and every time in the scanning cycle of the distributor, when the cathode ray falls upon that particular electrode, it can be arranged that a discharge shall take place from that electrode to a common anode in the proximity of all the target electrodes.

The result of this is the appearance, in an external circuit connected to the said common anode, of a pulse of electrical energy, occurring repetitively with every recurrence of the scanning cycle of the distributor and at the time position in that cycle to which the particular calling subscriber is assigned.

For the purpose of initiating a call or transmitting dialling impulses, a steady or interrupted D. C. signal may be applied to the distributor from the subscriber's instrument, in which case the pulse appearing in the common anode of the distributor at the time position of the calling subscriber, will be a regular pulse of more or less constant amplitude, when the said D. C. signal is present.

It is possible, however, to vary the potential applied from the calling subscriber's instrument either by modulating it with tones or other signals to convey dialling signals or by a transmitter such as the microphone of a telephone instrument, in the form of communication signals.

The variations in potential thus applied to the particular distributor electrode will cause corresponding variations in the amplitude of the discharge from that electrode to the common anode, when the cathode ray is scanning that electrode, and by a suitable choice of scanning cycle frequency, the modulation envelope of the varying-amplitude-periodic-pulses passing into the common anode of the distributor can be made to reproduce communication signals or other signals, generated by the subscriber's instrument.

It is necessary to arrange that the modulation of these pulses does not exceed 50% since the arrangements, which are hereinafter described, for maintaining the call, demand that the pulse shall not be extinguished, even momentarily, by the troughs of speech or other modulation.

Amplitude modulated pulses from the distributor can be demodulated by known means and passed to another subscriber's line attached to the same distributor by arranging that such signals shall be delayed for a period, or stored and re-transmitted after an interval of time, such period or interval corresponding to the difference between the time position of calling and called subscribers in the scanning cycle of the distributor. One means of re-transmitting signals to a called subscriber is to apply the delayed signals to a grid within the distributor, which alters the intensity of the electron beam, in conformity with the fluctuations of the said signal, at the instants of time when the beam is scanning the electrode assigned to the called subscriber.

The methods whereby the calling subscriber is allotted to a connecting channel, and one only, whereby he is insured the exclusive use of that channel to the exclusion of other callers, and whereby both calling and called subscribers can be isolated from and indicated as busy to other callers, are the subject of this invention.

The said embodiment will now be described by reference to the accompanying drawings in which.

Figure 1:
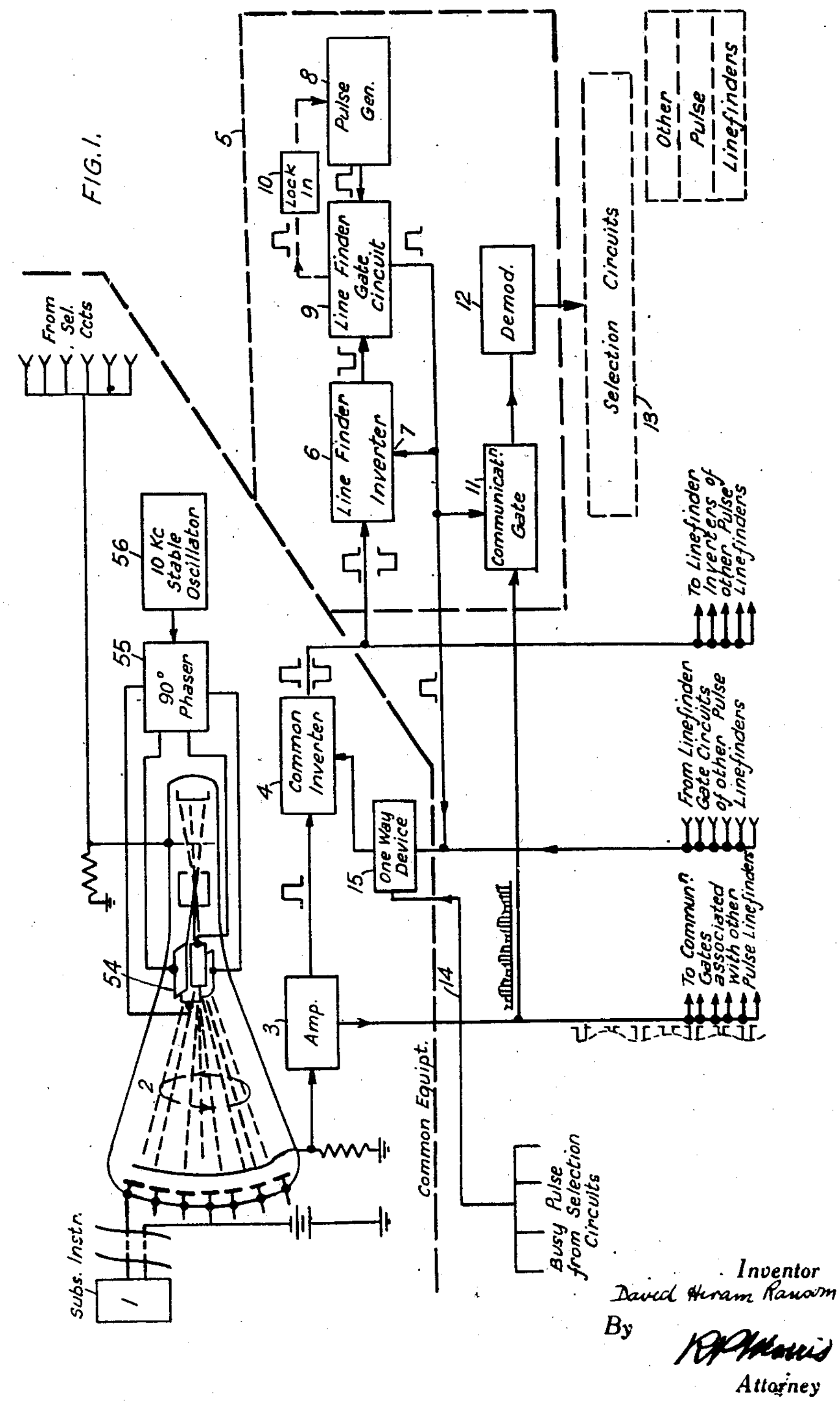
Fig. 1 is a block schematic drawing of the embodiment.

Referring to Fig. 1 the periodic pulse generated by the initiation of a call in a subscriber's instrument, 1, is passed from the distributor, 2, to an amplifier, 3, which may consist of a valve or valves arranged in known manner to amplify the pulse. Two outputs are taken from amplifier 3, one being taken to circuits concerned with the transmission of communication signals, and this output may be "clipped" so that pulses below a certain level are ineffective, giving the effect of 100% modulation. The other output (hereinafter called the "calling pulse"), may be "clipped" so that the pulses are of uniform amplitude, the modulation being removed, though this is not essential. The calling pulse is passed to an inverter unit 4 (hereinafter called "the common inverter") to which there are two inputs, one the said pulse from amplifier 3, the other being produced elsewhere within the apparatus in a manner to be explained later.

Normally, the output from the common inverter, 4, when fed with a calling pulse, is a positive pulse, but when a pulse is fed into the said second input of the common inverter in synchronism with the calling pulse, the output is a negative pulse.

The apparatus so far described is common to all subscribers attached to the distributor and is hereinafter referred to as "the common equipment."

The output from the common inverter is passed in common to several interconnecting channels (hereinafter called "pulse linefinders") the number of which corresponds with the number of simultaneous conversations within the capacity of the exchange. In Fig. 1, No. 1 linefinder is shown in detail enclosed in a dotted line and indicated by reference numeral 5.

The pulse from the common inverter enters another inverter unit 6 (hereinafter called a "linefinder inverter"), in each of the pulse linefinders and from these linefinder inverters the normal output is a negative pulse, when a positive pulse is fed into them. In the presence of another pulse, of positive polarity, fed into a linefinder inverter at another point 7, however, the polarity of the output pulse is inverted in relation to that of the pulse received from the common inverter. The purpose of this will be explained later. Also included in each pulse linefinder is a pulse generator 8. The pulse generator emits pulses of a duration similar to that of the calling pulses and of a repetition frequency approximately equal to the frequency of the scanning cycle of the distributor but varying therefrom.

Advantage is taken of the difficulty of producing independent pulse generators, that will work to identical frequencies, in the following manner. The pulses from the linefinder inverters meet the outputs from their associated pulse generators, in linefinder gate circuits 9, of which each pulse linefinder has one.

The steady negative pulses from the linefinder inverters occurring on the initiation of a call and the pulse generator pulses, fluctuate in phase relation to one another and eventually two individual pulses coincide in the linefinder gate circuit 9 of one of the pulse linefinders. The likelihood of two or more linefinders arriving at synchronism in this way, at the same instant is extremely remote owing to the variation between the various pulse generator frequencies in the various pulse linefinders.

Until this coincidence is obtained in one of the pulse linefinders, there is no output from the linefinder gate circuits. The first pulse linefinder to achieve coincidence emits a pulse (hereinafter called a "gate pulse"), from its linefinder gate circuit and this pulse is passed through a lock-in circuit 10, to the associated pulse generator 8 which is thereafter locked into synchronism in phase and frequency with the pulses from the distributor at the time position of the calling subscriber.

For ease of explanation the description will now be concentrated upon the particular pulse linefinder which has first picked up the call under discussion.

It has been stated above that a linefinder gate circuit gives no output unless it is fed simultaneously with two synchronous pulses, one, of negative polarity, from the common equipment via the linefinder inverter 6 and one of positive polarity, from its associated pulses generator 8. This state of affairs obtains as soon as the oscillator and pulse generator 8 locks itself to the distributor scanning frequency.

The linefinder gate circuit 9 now continuously emits positive pulses at the time and repetition frequency of the pulse generator 8 and this pulse is passed:

(*a*) To the pulse generator 8, which remains locked to the calling pulse, as explained above.

(*b*) To the second input of the common inverter 4: where it has the effect of reversing the polarity of the pulse emitted by the common inverter, at the time position of the call in question (but not at other time positions).

(*c*) To the linefinder inverter 6 of the pulse linefinder under discussion: where it meets the reversed pulse (above described) from the common inverter 4. The coincidence of the changed polarity of the pulse from the common inverter 4 and the presence of an inverting pulse in the second input 7 of the linefinder inverter 6 (where previously there was no pulse) combine to cancel one another out and the pulses from the linefinder inverter 6 continue to be of the same polarity as before. The linefinder gate circuit 9 therefore continues to receive a negative pulse necessary to its operation.

(*d*) To the parts of the apparatus concerned with the passage of the speech currents, as will be explained later.

From this time, until the end of a call, this pulse linefinder 5 is protected against interference from other callers in the following manner:

(1) Such other callers cannot, in any event, put out a calling pulse at the same time position, in the distributor scanning cycle, as the occupying caller, as all subscribers have different time positions.

(2) In other time positions, all pulse linefinders 5 will receive a positive pulse when a call is initiated, and this also applies to the occupied pulse linefinder.

(3) Other pulse linefinders, whose pulse generators 8 are still running free, can achieve coincidence with the pulses from another incoming call, but not so the occupied pulse linefinder 5 as its pulse generator 8 is locked into synchronism, in frequency with the scanning cycle of the distributor and in a phase such that the pulse from the pulse generator 8 occurs only at a time coinciding with the occupying caller's time position. At other times there is no pulse from this pulse generator to produce an output from the linefinder gate circuit 9 of the pulse linefinder in question.

(4) Would-be interfering calling pulses therefore, pass as far as the linefinder gate circuit 9 of an occupied pulse linefinder, but have no further effect.

The further operation of a pulse linefinder in maintaining a call will now be described.

In order that the call which has obtained the use of a pulse linefinder does not continue to pick up other pulse linefinders in addition, the linefinder gate circuits 9 are arranged so that they will respond only to a negative pulse. The negative pulse from the common equipment, occuring at the time position of the subscriber initiating the call, as soon as that call has picked up a pulse linefinder 5, is therefore ineffective in other pulse linefinders. Since the normal effect of the linefinder inverter 6 is to reverse a negative pulse so that it becomes positive, the so-called "inversion" being in practice the failure to make this reversal, the other pulse linefinders, whose linefinder inverters are not inverting, will pass a positive pulse to their linefinder gate circuits 9 from which the latter cannot operate.

The output from the line-finder gate circuit previously referred to in sub paragraph "(d)," will now be explained: It is passed to a gate circuit 11 (hereinafter called a "communication gate") which only has an output during the time when such pulses are present.

There is a communication gate 11 associated with each pulse linefinder.

All the communication gates are also fed in parallel from the second output, above described, from the amplifier 3 in the common equipment, being the output containing, substantially, the signalling or communication modulation contents of the pulses received from the distributors.

The communication gate associated with the pulse linefinder under discussion will therefore receive all the pulses from the distributor anode, on all time positions in the distributor scanning cycle but will be unresponsive to all of them except the one occurring at the time position of the gate pulse received from its associated pulse linefinder. This, it will clearly be seen, corresponds to the time position in the distributor scanning cycle, of the caller who has picked up this pulse linefinder. Other communication gates 11 are unresponsive to the speech currents of this subscriber because they cannot reecive an opening gate pulse from their associated pulse linefinders at the time position of that suscriber in the distributor scanning cycle.

When activated by gate pulse, the communication gate 11 gives an output proportional in amplitude to, or in other manner reproducing the modulation content of the input from amplifier 3 in the common equipment, and this modulation content may contain dialling digits, in the form of pulses or tone signals, or communication signals such as speech currents, originated by the calling subscriber.

The output from the communication gate in the form of modulated pulses, passes through a demodulator 12, which may be a low pass filter, to certain circuits (hereinafter called the "selection circuits") the function of which is to receive, register, and store designation signals and to translate them into a result corresponding to the difference in time between the time positions of the calling and called subscribers, in the distributor scanning cycle. This result may be caused to impose an actual time delay upon the communication signals received from the caller's line or to store and release them after the appropriate time interval. The delayed or released signals are passed to a common control grid in the distributor 2 where they modulate the electron beam at those instants when it is scanning the electrode of the called subscriber.

Part of the output of the selection circuits consists of a pulse occurring at the time position of the called subscriber, the initial effect of which is to pass a calling signal to his instrument, and when he responds to the call this pulse is applied to the common inverter 4, along connection 14 and through a one way device 15 and the common inverter 4 is caused to give a pulse of reversed polarity to all the pulse linefinders, at the called subscriber's time position.

The pulse linefinders are unresponsive to this reversed pulse and this is the way in which the pulse linefinders are prevented from locking to the called subscriber's line when he answers the call.

The called subscriber is now in a position to receive the speech signals from the caller's line, which are applied to the control grid of the distributor in manner above described.

The selection circuits contain an arrangement whereby two callers cannot simultaneously select the same called subscriber.

When the calling subscriber terminates the call by replacing his handset, the calling condition is removed from the distributor and there is no longer a pulse delivered by the distributor anode at his time position in the scanning cycle. The consequent absence of a pulse in the pulse linefinder in use causes the pulse generator to fall out of synchronism with the distributor scanning frequency. The gate pulse from the linefinder gate circuit ceases, and the common inverter 4 reverts to the non-inverting condition, at that particular time position, and is ready to accept further calls from that subscriber. In addition to this, the associated communication gate 11 loses its opening gate pulse and ceases to give an output.

The selection circuits are so arranged that they restore to normal in the absence of pulses from the communication gate.

All circuits are now as they were before the call under discussion was initiated.

A more detailed description will now be given of certain circuits developed to fulfill the functions of the circuit elements illustrated in Fig. 1.

Figure 2:
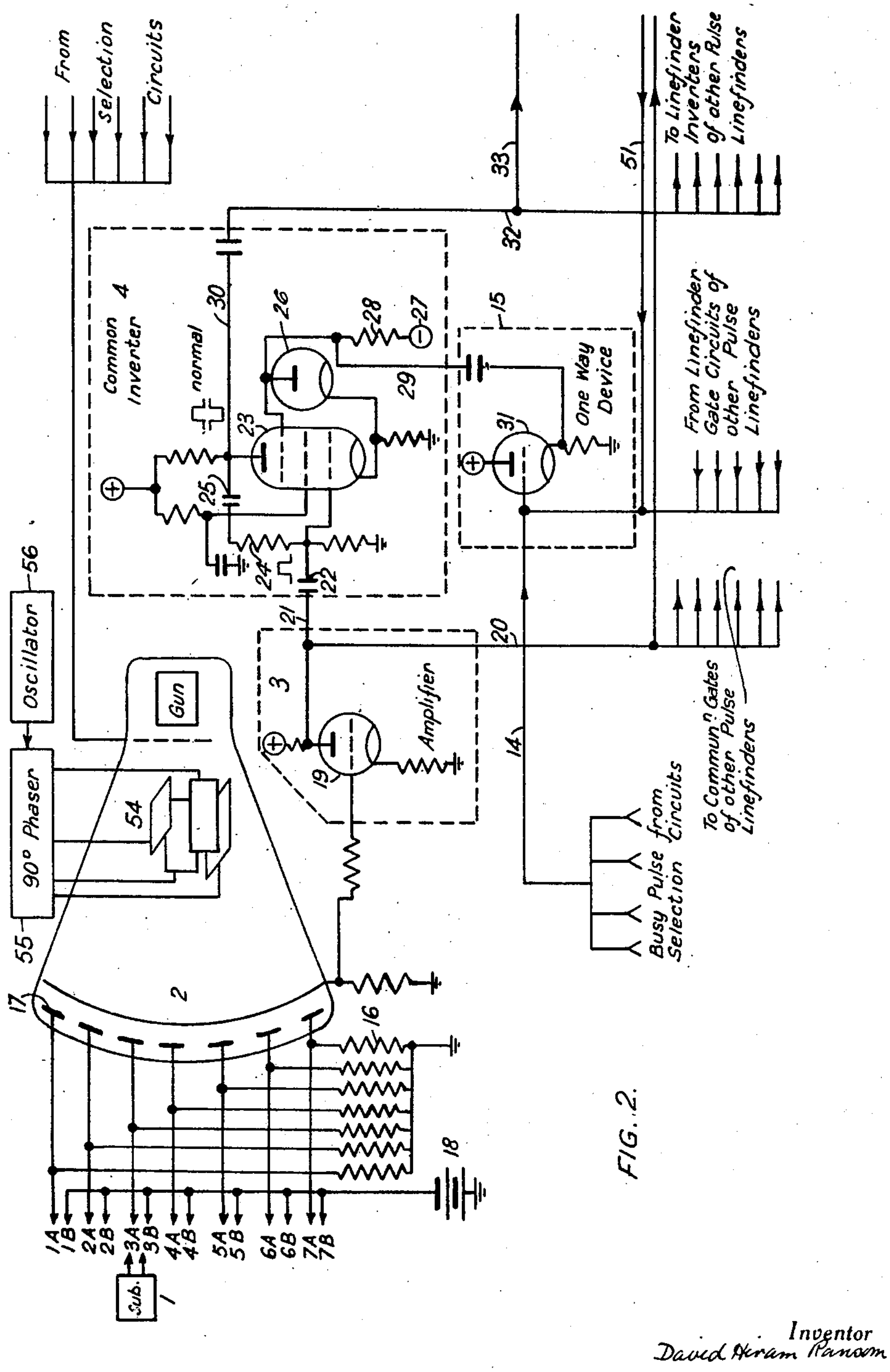
Fig. 2 is a circuit diagram of the common equipment illustrated schematically in Fig. 1.
Figure 3:
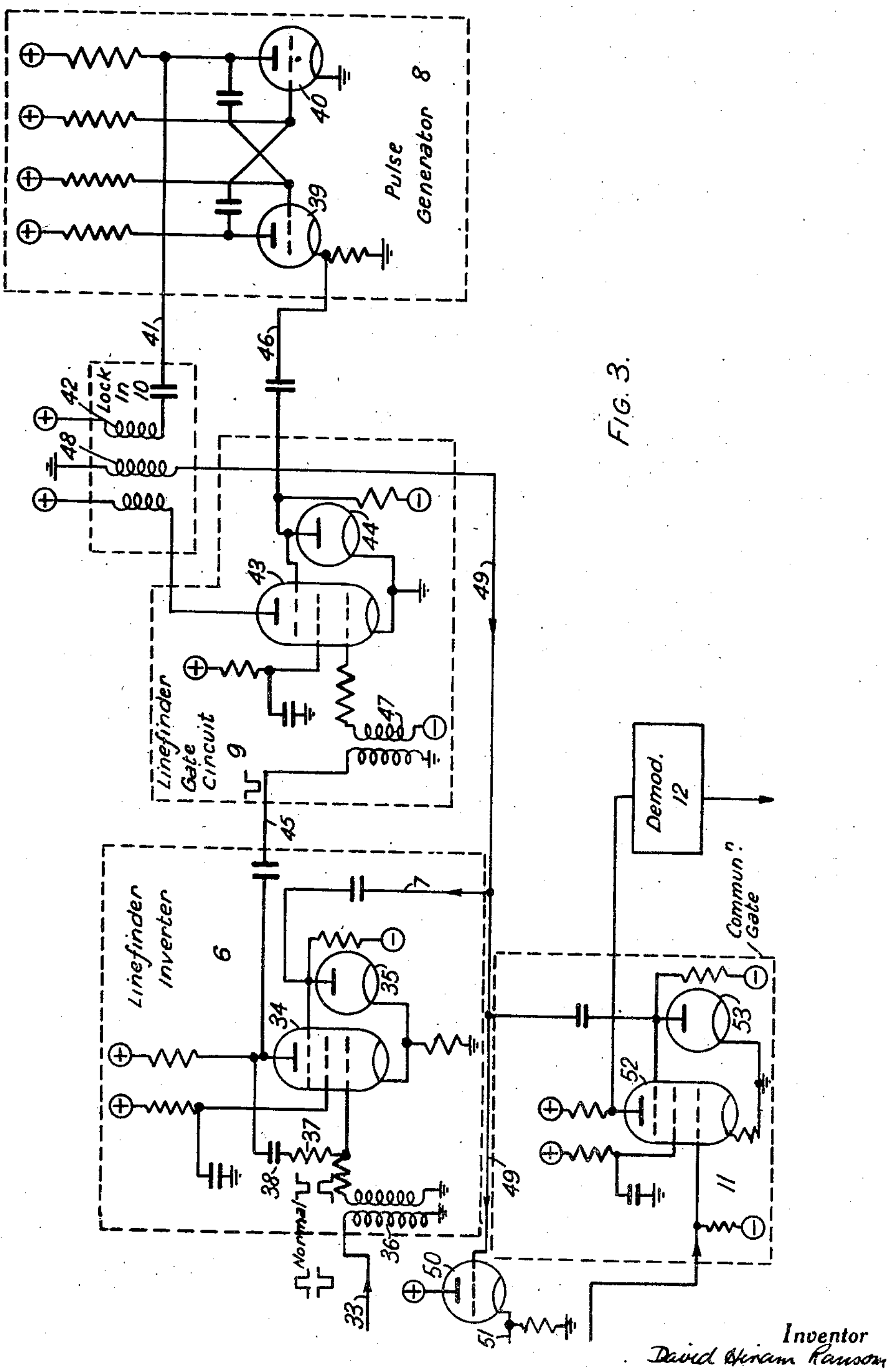
Fig. 3 is a circuit diagram of No. 1 pulse linefinder illsutrated schematically in Fig. 1.

These circuits are shown in Figs. 2 and 3 in which circuits, corresponding to the rectangles of Fig. 1 are enclosed in dotted lines and indicated by the same reference numerals as are used for corresponding elements in Fig. 1.

In Fig. 2, which shows the common equipment, the connections to the scanned elements of distributor 2 are shown as pairs of arrows designated A and B respectively and prefixed by numerals indicating the different subscribers' instruments to which they are connected.

The "A" connections are connected to the respective target elements of the distributor of which one is designated by reference numeral 17, and these target elements are earthed through individual impedances 16. The "B" connections are connected together and earthed through a source of steady potential represented by battery 18.

When a loop is made across the "A" and "B" connections of one subscriber, a potential is applied to the corresponding target element and when the cathode ray beam strikes this target, secondary emission takes place to the common anode causing a negative pulse to be emitted by the anode at that time instant.

This negative pulse is applied to the grid of valve 19 in amplifier 3, which is shown by way of example as a single stage triode amplifier but may of course be a multi-stage amplifier using any suitable valve or valves.

Two outputs are taken from valve 19, one along connection 20 and the other along connection 21. That along connection 20 may be arranged, by suitable means not shown, to contain only those parts of the pulse amplitude above a certain level so that when the pulses are amplitude modulated the "troughs" of the modulation envelope reduce the pulse amplitude approximately to zero level so that the pulse is virtually eliminated in connection 20 during such troughs, but it is not essential to do this.

The output in connection 21 is fed through coupling condenser 22 to the control grid of valve 23 in the common inverter 4. This valve is shown as a pentode but other types of valve or more than one valve can be used which are capable of accepting two controlling inputs. The pulses on the grid of 19 are negative, causing decreased current to flow in the anode load of the valve and causing the anode of 19 to become more positive. The pulses in connection 21 are therefore positive in polarity.

Pulses reaching the control grid of 23 are also, therefore, of positive polarity and may be limited in amplitude by limiting means (not shown) or alternatively may be allowed to retain any amplitude modulation impressed thereon by the communication signals of a calling subscriber.

Valve 23 is biassed on its suppressor grid so that normally it does not pass anode current. When its control grid receives a positive pulse from 19 this pulse is passed directly to connection 30 via network 24—25.

A diode 26 normally biassed to the non-conducting condition by potential 27, via impedance 28 becomes conducting when a positive pulse is applied to its anode along connection 29. The same positive pulse is also applied to the suppressor grid of 23 which assumes the same potential as the cathode, the diode 26, now conducting, serving as a short circuit between suppressor grid and cathode. If such a positive pulse on the suppressor grid of valve 23 coincides with a positive pulse on its control grid it will pass anode current due to the simultaneous "opening up" of its suppressor grid and the positive pulse on its control grid. This results in a negative pulse at the anode 23 and it is arranged that this pulse, which is amplified, is of sufficient amplitude to overcome the pulse at the anode from network 24, 25 and to produce a negative pulse of amplitude approximately as great as the positive pulse from 24, 25 when the suppressor grid of 23 is "cut off." Thus the result of a positive pulse on the control grid of 23 coinciding with a positive pulse on the suppressor grid, is a negative pulse in connection 30, and this is the inversion process which is the function of the common inverter.

It is thus seen how the common inverter alters the polarity of the pulse from amplifier 3 when a gate pulse is applied to it at the same time position.

The one way device consists of a valve 31, connected as a cathode follower. It is inserted as an impedance marking device and may be omitted in certain cases.

The pulses from the common inverter pass along connection 32 to all the pulse linefinders, one of which is shown in detail in Fig. 3.

The pulse from the common inverter enters, along connection 33 the linefinder inverter 6 which contains a valve 34 and a diode 35 and is similar in operation to the common inverter 4, pulses being applied from connection 33 to the control grid of 34 via a pulse transformer 36 which reverses their polarity. Gate pulses from connection 7 are applied to the suppressor grid of 34, and diode 35 performs the same function as diode 26 in the common inverter.

Positive pulses from connection 33 (when 23 is not inverting) reach the control grid of 34 as negative pulses and this valve is normally "cut off" on its suppressor grid. When 23 is inverting these pulses become positive on the control grid of 34 whose suppressor grid is simultaneously "opened up," causing anode current to flow. In the former case, (i. e. when the common inverter 4 is not inverting), negative pulses appear on the anode of 34 via network 37, 38, and in the latter case negative pulses also appear at the anode of 34 due to the surge of anode current in the valve, since the same gap pulse which causes the common inverter 4 to invert, also causes the linefinder inverter 6 to re-invert. It may be arranged that the pulse amplitude of both pulses is the same by suitable biasing of the valve, but this is not essential.

The pulse generator 8 consists of two valves 39 and 40 connected as a multi-vibrator of the self restoring type, omitting a positive pulse from the cathode circuit of 39 when that valve becomes conducting. Normally the frequency of the pulse from 39 is governed by the circuit constants of the multivibrator circuit and differs by a small amount, for instance 1 per cent, from the scanning frequency of the distributor, (that is to say, the frequency at which complete cycles of the distributor are repeated).

When however, a positive pulse is applied to the anode of 40, along connection 41, from winding 42 of the transformer which forms the lock in device 10, the grid of 39 is driven positive at these times and 39 passes anode current resulting in a synchronous positive pulse from the cathode circuit of 39, and it is arranged that this pulse from connection 41 over-rides the natural periodicity of pulse generator 8, so that it is synchronised in frequency and phase with the pulse from connection 41.

The linefinder gate circuit 9 resembles the common inverter and linefinder inverter having a valve 43 and a diode 44 and being fed with pulses along connection 45 from the linefinder inverter and along connection 46, with pulses from the pulse generator.

The pulses from connection 45 go to the control grid of the valve 43 via a pulse transformer 47 which reverses their polarity and these from 46 go to the anode of the diode 44 normally biased non-conducting and to the suppressor grid of valve 43.

43 is normally biased to "cut-off" on its suppressor grid and is "opened up" only when a positive pulse is applied to its suppressor grid. When negative pulses from connection 45, converted to positive pulses by transformer 47, reach the control grid of 43 at the same time as positive pulses on its suppressor grid, the valve passes anode current and a pulse is produced in the transformer in lock-in device 10.

It has already been explained how a pulse from transformer winding 42 locks the pulse generator 8 into synchronism with that pulse. This takes place in the first instance when the pulse from connection 45 and the pulse from 46, (whilst the pulse generator is "running free") drift into phase (which will soon happen in one or other of the pulse linefinders due to the frequency difference). As soon as this coincidence happens, the linefinder gate circuit 9, produces a gate pulse in lock-in device 10, which locks the pulse generator into phase with it and holds it locked so long as the pulses continue to come from connection 45.

The gate pulse from transformer winding 48 is applied to the common inverter via connection 49, valve 50 connected as a cathode follower, connection 51, and one way device 15 (Fig. 2) and connection 29.

The gate pulse is also applied at connection 7 to the linefinder inverter 6.

The effect of the gate pulse on the common inverter 4 is to reverse the polarity of the pulse coming from it along connections 30, 32, 33, making the pulse negative. This becomes a positive pulse by reason of transformer 36 when it reaches the control grid of valve 34 and would ordinarily cause a positive pulse to appear at the anode of 34 via network 37, 38, but the gate pulse opens the valve at its suppressor grid and the result is a negative pulse on the anode of 34.

The result of the inversion of the pulse by the common invertor 4 has thus been cancelled out.

At other time positions the pulses in connection 33 may be either positive, as for instance when another subscriber is initiating a call but has not yet taken up a linefinder, or negative when another subscriber has taken up another linefinder.

In the former case, positive pulses will appear on the grid of valve 43, since they are changed to negative by transformer 36, and passing network 37, 38 unaltered (since 34 is "cut-off" on its suppressor grid at these time positions) are reconverted to positive by transformer 47. There will be no gate pulses in the anode circuit of valve 43 at these times however as valve 43 remains "cut-off," on its suppressor grid, in the absence of pulses at these time positions from pulse generator valve 39.

In the latter case, negative pulses will appear on the grid of valve 43, since the negative pulses from connection 33 are reversed by transformer, and, passing unaltered, as positive pulses, through network 37, 38, (as valve 34 is "cut-off" on its suppressor grid at these time positions), are again reversed by transformer 47. These negative pulses do not produce gate pulses from the anode circuit of 43 since it is cut off on its suppressor grid, in the absence of pulses at these time positions, from pulse generator valve 39, but it is also arranged that the negative pulses "cut-off" the valve on its control grid as well for reasons which appear in the next paragraph.

The negative pulses from the common inverter 4 at the time position of a subscriber who has occupied a pulse linefinder on reaching any other pulse linefinder will cause negative pulses due to double polarity reversal in pulse transformers 36 and 47 to appear on the control grid of its linefinder gate circuit valve 43 and this cuts off 43 on its control grid so that it cannot produce a gate pulse even if the pulse generator drifts into phase with the said pulses and "opens up" the suppressor grid of 43 in that other pulse linefinder.

It is thus seen that a pulse linefinder which has become appropriated by a calling subscriber is protected against intrusion by another calling subscriber and that a calling subscriber is prevented from appropriating more than one pulse linefinder, at a time.

The gate pulse is also applied to communication gate 11 which is similar to the linefinder gate circuit 9, having a valve 52 and a diode 53, the gate pulse being applied to the suppressor grid of the former and the anode of the latter which stabilises the suppressor grid potential of 52 at that of the cathode of 52, in the presence of a gate pulse.

The working conditions of the valve 52 are somewhat different from those of 43, the grid of 52 being biassed so that, when the suppressor grid is "opened up," the valve acts as an amplifier of pulses applied to its control grid, and reproduces any modulation impressed on such pulses.

The output from the anode of 52 is taken to demodulator 12 and passes thence to the selection circuits not shown.

The valve 52 is "cut-off" by its suppressor grid except when the latter is raised to cathode potential by the gate pulse.

The circuit elements 4, 6, 9 and 11, in Figs. 2 and 3 are shown as having pentode valves and separate diodes. Any valve or valves capable of being controlled simultaneously by two inputs applied to one or more control electrodes could equally well be used with minor circuit adjustments which will be obvious to anyone skilled in the art, and the diodes could equally well be incorporated in the same envelopes as the said valves or could consist of separate dry rectifiers.

In the attached drawings, the distributor 2 is shown with deflector plates 54 to which deflection potentials are applied by a 90° phasing circuit 55, driven by an oscillator 56 to give a rotary deflection to the cathode ray.

The scanning action of the distributor may however be of the linear type tracing parallel lines across target elements arranged draughtboard fashion.

It is also within the scope of the invention to use other forms of distributor.

In the foregoing description it has been said that pulses only appear in the common element of the distributor when a subscriber initiates a call. It is possible to arrange however that pulses are continuously transmitted but are increased in amplitude when a call is initiated.

The description has, for the sake of simplicity, been confined to a system with a limited number of subscribers and to "one-way" communication. It will nevertheless be apparent to those skilled in the art, that a larger number of subscribers and "both-ways" communication may be obtained by the duplication of some of the equipment.

I claim:

1. In an electronic switching arrangement for an automatic telephone exchange system, a plurality of lines, means for establishing connections between calling and called lines including a distributor scanning the lines at a predetermined frequency, a plurality of normally idle electronic switches, and a circuit for applying at the scanning frequency a pulse of a certain polarity to idle switches, means responsive to the initiation of a call on a line for operating said circuit, a device connected with each switch and adapted to be operated by the applied pulses for taking into use one of said idle switches, means in said circuit for altering the polarity of the pulses applied therethrough, and a connection controlled by the device for operating the last mentioned means.

2. In an electrical switching arrangement, the combination, according to claim 1, in which the means for establishing connections comprises a selection circuit, a communication switch for connecting the distributor with the selection circuit, and a path extending the connection to the communication switch for operating it simultaneously with said last mentioned means.

3. In an electronic switching arrangement for an automatic telephone exchange system, a plurality of lines, means for establishing connections between calling and called lines including a distributor scanning the lines at a predetermined frequency, a plurality of normally idle electronic switches, and a circuit for applying at the scanning frequency a pulse of a certain polarity to idle switches, means responsive to the initiation of a call on a line for operating said circuit, a device connected with each switch and adapted to be operated by the applied pulses for taking into use one of said idle switches, a first means connected with the distributor for controlling the polarity of the pulses applied through the circuit, a plurality of second means, one connected with each switch, for altering the polarity of the pulses applied through the circuit, and a connection controlled by the device for operating the first means and the second means associated with the switch taken into use.

4. In an electrical switching arrangement, the combination according to claim 3, in which said first and second means are multi-grid valves, each having a suppressor grid in said connection.

5. In an electrical switching arrangement, the combination, according to claim 4, in which a diode is provided with each valve linking its cathode with the suppressor grid.

6. In an electrical switching arrangement, the combination, according to claim 5, in which a path in each means directly connects the input of the connected valve with the output for the passage of pulses of said certain polarity, and electrodes are provided in each valve for passing the pulses from the input to the output in inverted and amplified form.

7. In an electrical switching arrangement, the combination, according to claim 3, further comprising a path for applying busy pulses over said connection to the first means.

8. In an electrical switching arrangement, the combination, according to claim 7, further comprising a one way device linking the first means with said connection and said path in multiple.

9. In an electronic switching arrangement for an automatic telephone exchange system, a plurality of lines, means including selection circuits and a distributor scanning the lines at a predetermined frequency for establishing connections between calling and called lines, said means comprising a plurality of normally idle electronic line finders connected with each line finder and, an oscillator at the exchange operating at a frequency different from the line scanning frequency, a circuit for applying at the scanning frequency a pulse of a certain polarity to idle line finders, means responsive to the initiation of a call on a line for operating said circuit, a lock-in device connected with each line finder, means in each line finder adapted to be operated by the applied pulses but only when an applied pulse coincides with an oscillator pulse for operating the lock-in device of an idle finder to bring said oscillator into synchronism with the scanning frequency, two pulse inverters in series in said circuit, the first common to all said line finders and the second individual to the seized line finder, a connection controlled by the locked-in oscillator for simultaneously operating both said inverters, and means controlled by the simultaneous operation of both said inverters for maintaining said oscillator in synchronism with the scanning frequency.

10. In an electrical switching arrangement, the combination, according to claim 9, further comprising a communication switch for connecting the distributor with the selection circuits, and a path extending said connection to the last-mentioned switch for operating it simultaneously with said inverters.

11. In an electrical switching arrangement, the combination, according to claim 10, in which said inverters and communication switch are multi-grid valves, having a suppressor grid in said connection and a diode is provided with each valve linking its cathode with the suppressor grid.

12. In an electrical switching arrangement, the combination, according to claim 9, in which the lock-in device comprises a transformer having three windings, the first connected with the oscillator, the second with the means for operating the lock-in device, and the third with connections.

13. In an electrical switching arrangement, the combination, according to claim 12, in which the means for operating the device comprises a multi-grid valve in each line finder having an anode connected with the second transformer winding, a control grid with the second of said inverters, and a suppressor grid with said oscillator.

14. In an electrical switching arrangement, the combination, according to claim 9, in which the first inverter is associated with the distributor and a separate second inverter with each line finder, an input circuit for the first inverter is connected with the distributor, and an input circuit for each second inverter is connected in multiple with the output of the first inverter.

15. In an electrical switching arrangement, the combination, according to claim 14, further comprising means for applying from said connection pulses of the same polarity to the first inverter and to the second inverter connected with the selected line finder.

16. In an electrical switching arrangement, the combination, according to claim 14, further comprising a path for applying busy pulses over said connection to the first inverter.

17. In an electrical switching arrangement, the combination, according to claim 16, further comprising a one way device linking the first inverter with said connection and said path in multiple.

18. In an electronic switching system for automatic telephone exchanges, a plurality of lines, a distributor for cyclically scanning the lines, an inverter having input and output circuits, means associated with each line for controlling the application to the input and therethrough to the output circuit of a pulse of one polarity when the distributor scans the particular line, a valve in said inverter having a first electrode connected with the input circuit, a second electrode connected with the output, and a third electrode for controlling the application via said second electrode of a pulse of the opposite polarity to the output, selecting means connected with the inverter output responsive to pulses of said one polarity applied to the inverter input, and a circuit controlled by the selecting means for controlling the functioning of the third electrode.

19. In an electrical switching arrangement, the combination, according to claim 18, in which the second electrode is an anode and the other electrodes are grids.

20. In an electrical switching system, the combination, according to claim 18, further comprising a diode connected between said third electrode and a fourth electrode of the valve.

21. In an electrical switching system, the combination, according to claim 20, and in which the second and fourth electrodes are, respectively, the anode and the cathode, the first electrode the control grid and the third electrode a suppressor grid.

22. In an electronic switching system for automatic telephone exchanges, a plurality of lines, a distributor cyclically scanning the lines, a first inverter having input and output circuits connected with the distributor, means connected with each line for controlling the application to the input and therethrough to the output circuit of a pulse of one polarity when the distributor scans the particular line, a valve in said inverter having a first electrode connected with the input circuit, a second electrode connected with the output, and a third electrode for controlling the application via said second electrode of a pulse of the opposite polarity to the output, selecting means having a second valve responsive to pulses of said one polarity, a second inverter having a third valve, an input circuit for the third valve connected with the output of the first valve, an output circuit for the third valve connected with the input of the second valve, a path for passing pulses from the input to the output circuit of the third valve, said third valve having a first electrode connected with its input circuit, a second electrode connected with its output, a third electrode for controlling the application via said second electrode of a pulse of the opposite polarity to its output, and a circuit controlled by the selecting means for controlling the third electrodes of the first and third valves.

23. In an electrical switching system, the combination, according to claim 22, in which the second electrode in each valve is an anode and the other electrodes are grids.

24. In an electronic switching arrangement a plurality of lines, and means for establishing connections between calling and called lines, said means comprising a distributor for scanning the lines at a predetermined frequency, means including said distributor for producing a pulse of a predetermined first polarity each time said distributor scans a calling line, a first circuit common to said plurality of lines and having an input and an output with said input connected to said distributor, so as to receive said pulse, a plurality of normally idle second circuits having inputs and outputs with the inputs multipled to the output of said first circuit, a separate oscillator connected to the output of each second circuit, said oscillators having a frequency slightly different from the scanning frequency, means in said first circuit for passing the pulse received by the input thereof to the output and thence to the inputs of said second circuits, means in said second circuits for passing the pulses thus received to the outputs of said second circuits, lock-in means responsive to the coincidence of a pulse from an oscillator and a pulse having only said first polarity appearing on the output of the associated second circuit for causing the frequency of said oscillator to shift so as to synchronize with the scanning frequency, means associated with each oscillator and responsive to the locking-in of said oscillator for producing a train of pulses at the scanning frequency, means connecting said last-mentioned means with said first and second circuits so as to deliver said train of pulses thereto, and means in said first and second circuits responsive to the pulses of said train for inverting said first-mentioned pulses passing through said circuits, whereby a pulse of said first polarity, because of the double inversion, will be delivered to said lock-in means so as to maintain the associated oscillator in synchronism with the scanning frequency, but the lock-in means of all other second circuits will receive a pulse of opposite polarity from said first circuit, so that the oscillators associated therewith can not be locked-in.

25. In an electronic switching arrangement, the combination, according to claim 24, in which the first and second circuits include electron discharge devices each having an anode and a cathode and at least two control grids, the input of the associated circuit being connected to one control grid and the output being connected to the anode, and means to pass a pulse from the input to the output without alteration when the circuit is not inverting, the connecting means being connected to the other control grids whereby the train of pulses is delivered thereto.

26. In an electronic switching arrangement, the combination, according to claim 25, further comprising selection circuits, and means connected to the means for producing a train of pulses at the scanning frequency and responsive to said pulses for connecting the distributor with said selection circuits.

DAVID HIRAM RANSOM.

REFERENCES CITED

The following references are of record in the file of this patent:

UNITED STATES PATENTS

| Number | Name | Date |
|---|---|---|
| 2,036,350 | Montani | Apr. 7, 1936 |
| 2,172,354 | Blumlein | Sept. 12, 1939 |
| 2,185,693 | Mertz | Jan. 2, 1940 |
| 2,204,055 | Skellett | June 11, 1940 |
| 2,263,369 | Skillman | Nov. 18, 1941 |
| 2,295,032 | Deakin | Sept. 8, 1942 |
| 2,387,018 | Hartley | Oct. 16, 1945 |